US011751107B2

(12) United States Patent
Zhang et al.

(10) Patent No.: US 11,751,107 B2
(45) Date of Patent: Sep. 5, 2023

(54) APPARATUS, SYSTEM AND METHOD FOR SECURITY MANAGEMENT

(71) Applicant: NEC Corporation, Tokyo (JP)

(72) Inventors: Xiaowei Zhang, Tokyo (JP); Anand Raghawa Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 29 days.

(21) Appl. No.: 17/306,125

(22) Filed: May 3, 2021

(65) Prior Publication Data

US 2021/0258837 A1 Aug. 19, 2021

Related U.S. Application Data

(63) Continuation of application No. 16/985,763, filed on Aug. 5, 2020, now Pat. No. 11,032,747, which is a (Continued)

(51) Int. Cl.
*H04W 36/00* (2009.01)
*H04W 8/30* (2009.01)
(Continued)

(52) U.S. Cl.
CPC ......... *H04W 36/0038* (2013.01); *H04W 8/12* (2013.01); *H04W 8/30* (2013.01);
(Continued)

(58) Field of Classification Search
CPC .......................... H04L 63/083; H04W 12/041; H04W 12/068; H04W 36/0038; H04W 36/22; H04W 8/12; H04W 8/30
See application file for complete search history.

(56) References Cited

U.S. PATENT DOCUMENTS 9,271,222 B2   2/2016 Xie et al.
2011/0142239 A1  6/2011 Suh et al.
(Continued)

FOREIGN PATENT DOCUMENTS

CN   101610506 A   12/2009
CN   102685730 A   9/2012
(Continued)

OTHER PUBLICATIONS

Japanese Office Action for JP Application No. 2020-118371 dated Sep. 21, 2021 with English Translation.
(Continued)

*Primary Examiner* — Timothy X Pham
(74) *Attorney, Agent, or Firm* — Wilmer Cutler Pickering Hale and Dorr LLP

(57) ABSTRACT

There is provided a network system including one or more first MMEs (30), and a second MME (40) separated from the first MMEs (30). In one of operation cases, the first MME (30) pushes, to the second MME (40), security context for a UE (10) that attaches to the first MME (30). The second MME (40) stores the security context. The first MME (30) further pushes the latest security context to the second MME (40), during a switch-off procedure for the first MME (30). The second MME (40) updates the stored security context with the latest security context. The first MME (30) pulls the security context from the second MME (40), when the UE (10) re-attaches to the first MME (30) or is handovered from different one of the first MMEs (30).

8 Claims, 15 Drawing Sheets

Related U.S. Application Data continuation of application No. 16/146,694, filed on Sep. 28, 2018, now Pat. No. 10,986,544, which is a continuation of application No. 15/549,269, filed as application No. PCT/JP2016/000512 on Feb. 2, 2016, now abandoned.

(51) Int. Cl.

| | | |
|---|---|---|
| *H04W 8/12* | (2009.01) | |
| *H04W 12/041* | (2021.01) | |
| *H04W 12/06* | (2021.01) | |
| *H04W 36/22* | (2009.01) | |
| *H04L 9/40* | (2022.01) | |

(52) U.S. Cl.
CPC ....... *H04W 12/041* (2021.01); *H04W 12/068* (2021.01); *H04W 36/22* (2013.01); *H04L 63/083* (2013.01)

(56) References Cited

U.S. PATENT DOCUMENTS

| | | |
|---|---|---|
| 2012/0033659 A1 | 2/2012 | Zhang et al. |
| 2012/0287854 A1 | 11/2012 | Xie et al. |
| 2013/0018555 A1 | 1/2013 | Steinlage et al. |
| 2013/0136032 A1 | 5/2013 | Meirosu et al. |
| 2013/0188555 A1 | 7/2013 | Olsson et al. |
| 2013/0189951 A1 | 7/2013 | Lopez et al. |
| 2013/0203409 A1* | 8/2013 | Yang ................ H04W 8/04 455/432.3 |
| 2014/0021978 A1 | 1/2014 | Ikeda |
| 2014/0022996 A1 | 1/2014 | Punz |
| 2014/0126448 A1 | 5/2014 | Punz et al. |
| 2014/0153481 A1 | 6/2014 | Draznin et al. |
| 2014/0185585 A1 | 7/2014 | Zhang et al. |
| 2014/0219178 A1 | 8/2014 | Lopez et al. |
| 2014/0335830 A1 | 11/2014 | Wu |
| 2015/0071177 A1 | 3/2015 | Hu |
| 2016/0007385 A1 | 1/2016 | Sedlacek et al. |
| 2016/0127896 A1 | 5/2016 | Lee et al. |
| 2016/0374104 A1 | 12/2016 | Watfa et al. |
| 2017/0099623 A1 | 4/2017 | Shi et al. |
| 2017/0188280 A1 | 6/2017 | Watfa et al. |
| 2017/0201937 A1 | 7/2017 | Zhang et al. |
| 2019/0069204 A1 | 2/2019 | Zhang et al. |

FOREIGN PATENT DOCUMENTS

| | | |
|---|---|---|
| JP | 2001-500342 A | 1/2001 |
| JP | 2009-531952 A | 9/2009 |
| JP | 2019096918 A | 6/2019 |
| KR | 10-2014-0043484 A | 4/2014 |
| WO | WO-2010/086014 A1 | 8/2010 |
| WO | 2012/075664 A1 | 6/2012 |
| WO | WO-2012/136812 A1 | 10/2012 |
| WO | WO-2012/175664 A2 | 12/2012 |
| WO | WO-2014/093086 A1 | 6/2014 |

OTHER PUBLICATIONS

3GPP "3rd Generation Partnership Project; Technical Specification Group Services and System Aspects; 3G Security; Security architecture (Release 12)" 3GPP TS 33.102 V1 2.2.0 (Dec. 2014), pp. 1-76.

3GPP "3rd Generation Partnership Project; Technical Specification Group Services and System Aspects; Architecture Enhancements for Dedicated Core Networks; Stage 2 (Release 13)" 3GPP TR 23.707 V1.0.0 (Dec. 2014), pp. 1-39.

3GPP "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.1.0, (Dec. 2014), Dec. 17, 2014, pp. 1-310 (310 pages).

3GPP TS 33.401, "3GPP System Architecture Evolution (SAE); Security architecture (Release 12)", V12.13.0, Dec. 2014 (pp. 1-131).

Dionisio Zumerle "3GPP LTE Security Apsects", 3GPP Workshop, Bangalore, May 30, 2011, XP055089219, pp. 1-27 (27 pages).

Ericsson "UE and CN Synchronization in Dedicated Core Networks", SAWG2 Meeting #107, S2-150078 (revision of S2-15xxxx), Jan. 26-30, 2015 2015, Sorrento, Italy, pp. 1-4.

Extended European Search Report issued in European Patent Application No. 19175318.5, dated Jun. 14, 2019, 6 pages.

International Search Report corresponding to PCT/JP2016/000512 dated May 6, 2016 (4 pages).

Japanese Decision to Grant a Patent issued in Japanese Patent Application No. 2017-540906, dated Jun. 23, 2020, 5 pages.

Japanese Notice of Reasons for Refusal issued in Japanese Patent Application No. 2017-540906, dated Sep. 10, 2019, 6 pages.

NTT Docomo "Introduce the Dedicated Core Network (DECOR) Feature", SAWG2 Meeting #107, S2-150651 (revision of S2-150316, 0598), Jan. 26-30, 2015, Sorrento, Italy, Change Request, (56 sheets/pages).

U.S. Patent Office Non-Final Office Action issued in U.S. Appl. No. 16/985,763, dated Sep. 25, 2020, 15 pages.

Korean Office Communication for KR Application No. 10-2021-7035559 dated Jan. 20, 2022 with English Translation.

Korean Office Communication for KR Application No. 10-2017-7025547 dated Sep. 15, 2021 with English Translation.

\* cited by examiner

APPARATUS, SYSTEM AND METHOD FOR SECURITY MANAGEMENT

CROSS-REFERENCE TO RELATED APPLICATIONS

This present application is a continuation patent application of U.S. patent application Ser. No. 16/985,763 filed on Aug. 5, 2020, which is a continuation patent application of U.S. patent application Ser. No. 16/146,694 filed on Sep. 28, 2018 now U.S. Pat. No. 10,986,544, which is a continuation patent application of U.S. patent application Ser. No. 15/549,269 filed on Aug. 7, 2017, which is a U.S. national stage application of International Application No. PCT/JP2016/000512 entitled "Apparatus, System and Method for Security Management" filed on Feb. 2, 2016, which claims priority to Japanese Patent Application No. 2015-026201 filed on Feb. 13, 2015, the disclosures of which are hereby incorporated by reference in their entirety.

TECHNICAL FIELD

The present invention relates to an apparatus, a system and a method for security management, and particularly to a technique to manage security context for a UE (User Equipment).

BACKGROUND ART

In the current EPS (Evolved Packet System), as disclosed in e.g., NPL 1, AKA (Authentication and Key Agreement) procedure and NAS (Non Access Stratum) SMC (Security Mode Command) procedure are performed, so that NAS security context for a UE (hereinafter, sometimes referred to as "UE context" or simply "security context") is shared between the UE and an MME (Mobility Management Entity).

The NAS security context includes Kasme with the associated KSI (Key Set Identifier), and the like. The Kasme and the KSI are used for deriving the same NAS keys at both the UE and the MME. The NAS keys are used for protecting integrity and confidentiality of traffic between the UE and the MME.

CITATION LIST

Non Patent Literature

NPL 1: 3GPP TS 33.401, "3GPP System Architecture Evolution (SAE); Security architecture (Release 12)", V12.13.0, 2014-12

SUMMARY OF INVENTION

Technical Problem

However, the inventors of this application have found that the following problems may arise in the current architecture.

Specifically, in mobility, new MME has to retrieve the UE context from an old MME or SGSN (Serving GPRS (General Packet Radio Service) Support Node). It requires that the UE indicate the old MME/SGSN (MME or SGSN) in GUTI (Globally Unique Temporary Identity) or P-TMSI (Packet-TMSI (Temporary Mobile Subscriber Identity)). Note that the new MME is the one to which the UE newly attaches, and the old MME/SGSN is the one to which the UE previously attached.

Meanwhile, the old MME/SGSN may have already removed the UE context. In this case, AKA/NAS SMC (AKA and NAS SMC) procedures are performed again under the initiative of the new MME. Such redundant performance causes signaling overload to devices/nodes (devices and nodes), in particular the MME, involved in the AKA/NAS SMC procedures and all interfaces therebetween. As the number of UEs increases, such overload will become much more pronounced.

Moreover, it is predicted that virtualization will need to create and/or remove the MME on demand. In this case, the UE context will be retrieved and/or removed frequently. Therefore, the overload will be caused as in the mobility case.

Accordingly, an exemplary object of the present invention is to provide a solution for alleviating overload on AKA/NAS SMC procedures.

Solution to Problem

In order to achieve the above-mentioned object, first exemplary aspect of the present invention provides a network system including: one or more first MMEs; and a second MME separated from the first MMEs. The first MME pushes, to the second MME, security context for a UE that attaches to the first MME. The second MME stores the security context.

According to second exemplary aspect of the present invention, there is provided an MME including: pushing means for pushing, to a second MME separated from the MME, security context for a UE that attaches to the MME. The second MME is also separated from one or more first MMEs to which the UE can attach and which is different from the MME.

According to third exemplary aspect of the present invention, there is provided a method of managing security context in an MME. This method includes: pushing, to a second MME separated from the MME, security context for a UE that attaches to the MME. The second MME is also separated from one or more first MMEs to which the UE can attach and which is different from the MME.

According to fourth exemplary aspect of the present invention, there is provided a method of managing security context in an MME separated from one or more first MMEs. This method includes: receiving security context pushed from the first MME, the security context for a UE that attaches to the first MME; and storing the security context.

According to fifth exemplary aspect of the present invention, there is provided a network system including: one or more first MMEs; and a second MME separated from the first MMEs. The second MME generates security context for a UE that requests to attach to the first MME, and pushes the security context to the first MME. The first MME stores the security context.

According to sixth exemplary aspect of the present invention, there is provided an MME including: receiving means for receiving, from a second MME separated from the MME, security context for a UE that requests to attach to the MME; and storing means for storing the security context. The second MME is also separated from one or more first MMEs to which the UE can attach and which is different from the MME.

According to seventh exemplary aspect of the present invention, there is provided an MME separated from one or more first MMEs. This MME includes: generating means for generating security context for a UE that requests to attach to the first MME; and pushing means for pushing the security context to the first MME.

According to eighth exemplary aspect of the present invention, there is provided a method of managing security context in an MME. This method includes: receiving, from a second MME separated from the MME, security context for a UE that requests to attach to the MME; and storing the security context. The second MME is also separated from one or more first MMEs to which the UE can attach and which is different from the MME.

According to ninth exemplary aspect of the present invention, there is provided a method of managing security context in an MME separated from one or more first MMEs. This method includes: generating security context for a UE that requests to attach to the first MME; and pushing the security context to the first MME.

According to tenth exemplary aspect of the present invention, there is provided a network system including: one or more first MMEs; and a second MME separated from the first MMEs. The second MME centrally manages security context for a UE that requests to attach to a network, through a direct connection to an eNB to which the UE wirelessly connects. The first MME supports mobility of the UE to the second MME.

According to eleventh exemplary aspect of the present invention, there is provided an MME separated from one or more first MMEs. This MME includes: managing means for centrally managing security context for a UE that requests to attach to a network, through a direct connection to an eNB to which the UE wirelessly connects. The first MME supports mobility of the UE to the MME.

According to twelfth exemplary aspect of the present invention, there is provided a method of managing security context in an MME separated from one or more first MMEs. This method includes: centrally managing security context for a UE that requests to attach to a network, through a direct connection to an eNB to which the UE wirelessly connects. The first MME supports mobility of the UE to the MME.

Advantageous Effects of Invention

According to the present invention, it is possible to provide a solution for alleviating overload on AKA/NAS SMC procedures, thereby solving at least a part or the whole of the above-mentioned problems.

DESCRIPTION OF EMBODIMENTS

Hereinafter, an exemplary embodiment of an apparatus, a system and a method according to the present invention will be described with reference to the accompanying drawings.

Figure 1:
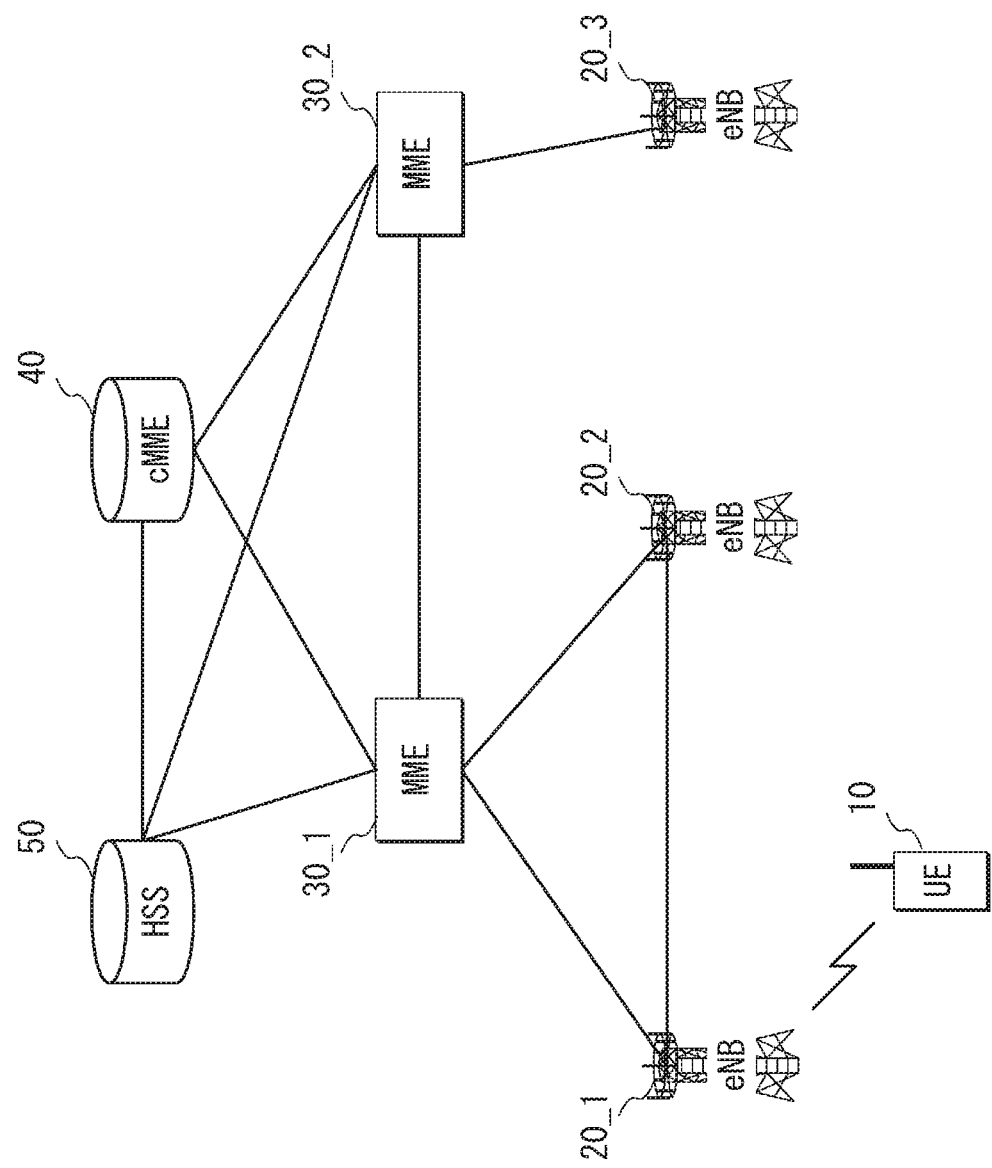
FIG. 1 is a block diagram showing a configuration example of a network system according to an exemplary embodiment of the present invention.

As shown in FIG. 1, a network system according to this exemplary embodiment includes one or more MMEs 30_1 and 30_2 (hereinafter, sometimes collectively denoted by the symbol 30), and a cMME (cloud MME) 40. Note that although two MMEs 30_1 and 30_2 are shown in FIG. 1, the network system may be provided with MMEs more than three. In such a case, the following explanation can also be similarly applied.

Briefly, the cMME 40 serves as the offload location for e.g., storing security context for a UE 10. Here, the UE 10 wirelessly connects to any one of eNBs 20_1 to 20_3 (hereinafter, sometimes collectively denoted by the symbol 20). Moreover, as will be described later, the UE 10 attaches to any one of the MMEs 30_1 and 30_2 as well as the cMME 40, through the eNB 20. Note that although one UE and three eNBs are shown in FIG. 1, the network system may be provided with UEs more than two, and eNBs less or more than three. In such cases, the following explanation can also be similarly applied.

In other words, the security context is stored in cloud (cMME 40), not in the MME 30 itself. Any MME going live will have context to securely connect with the offload location (cMME 40). The offload location can be distributed or centralized. Virtual image of the offload location could be brought up or down at a given location based on pattern— user, usage etc. Moreover, the offload location may be configured not only by the cloud but also by a tangible MME which represents the pool of MMEs, for example.

Further, the MME 30 and the cMME 40 can access an HSS (Home Subscriber Server) 50 on demand to acquire credentials necessary for authenticating the UE 10 in the AKA procedure.

Next, there will be described operation examples of this exemplary embodiment, as to the following cases A to C with reference to FIGS. 2 to 10.

<Case A>

This case "A" deals with a case where the cMME 40 serves as storage only for the security context.

Figure 16:
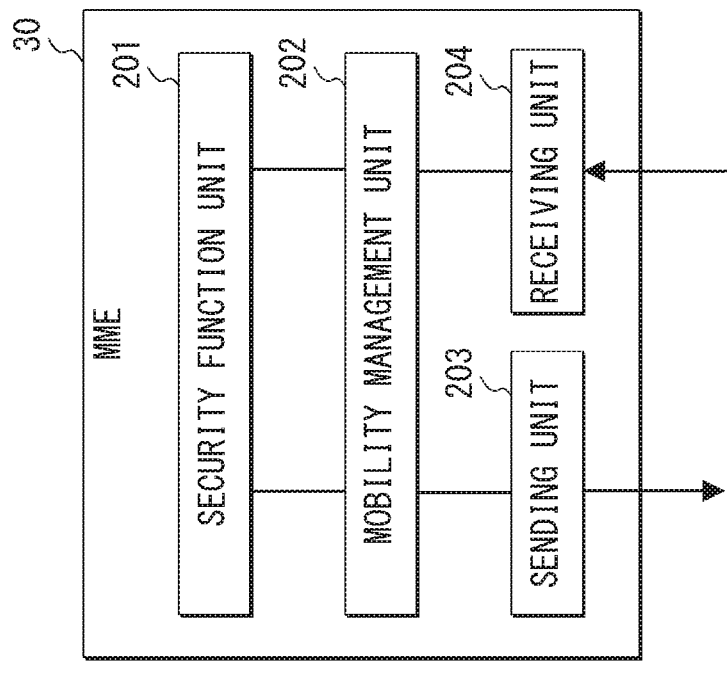
FIG. 16 is a block diagram showing conceptual configurations of the MME according to the exemplary embodiment, in the first case.
Figure 16:
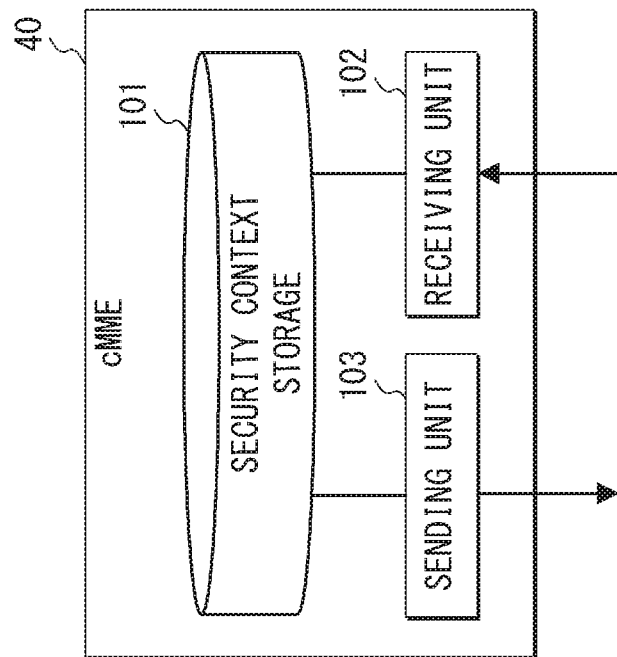

That is, as conceptually shown in FIG. 16, the cMME 40 includes security context storage 101, a receiving unit 102 and a sending unit 103. The receiving unit 102 receives security context from the MME 30, and stores the received security context in the storage 101. The sending unit 103 reads out the stored security context from the storage 101 in response to a request from the MME 30, and sends the read context to the MME 30.

On the other hand, the MME 30 includes a security function unit 201, a mobility management unit 202, a sending unit 203 and a receiving unit 204. The security function unit 201 creates and updates security context for the UE 10. The mobility management unit 202 manages mobility of the UE 10. The sending unit 203 and the receiving unit 204 send and receive various signaling messages from and to the UE 10, the MME 30 and the HSS 50. In particular, the sending unit 203 sends the security context and a request therefor to the cMME 40. The receiving unit 204 receives the security context from the cMME 40. Functionalities of the MME 30 are simplified compared with a typical MME, because the security context storage is shifted to the cMME 40.

Briefly, in this case "A", the following operations (1) to (4) are carried out.

(1) AKA and NAS SMC procedures (carried by the MME 30) will result in keys that should be stored in the storage (cMME 40).

(2) Current security context is stored in storage (cMME 40).

(3) Every time the MME 30 switches off or goes down, the MME 30 updates all security context stored in the storage (cMME 40).

(4) When the UE 10 connects to the MME 30 (Attach or Mobility), the security context can be pulled from the storage (cMME 40).

Figure 2:
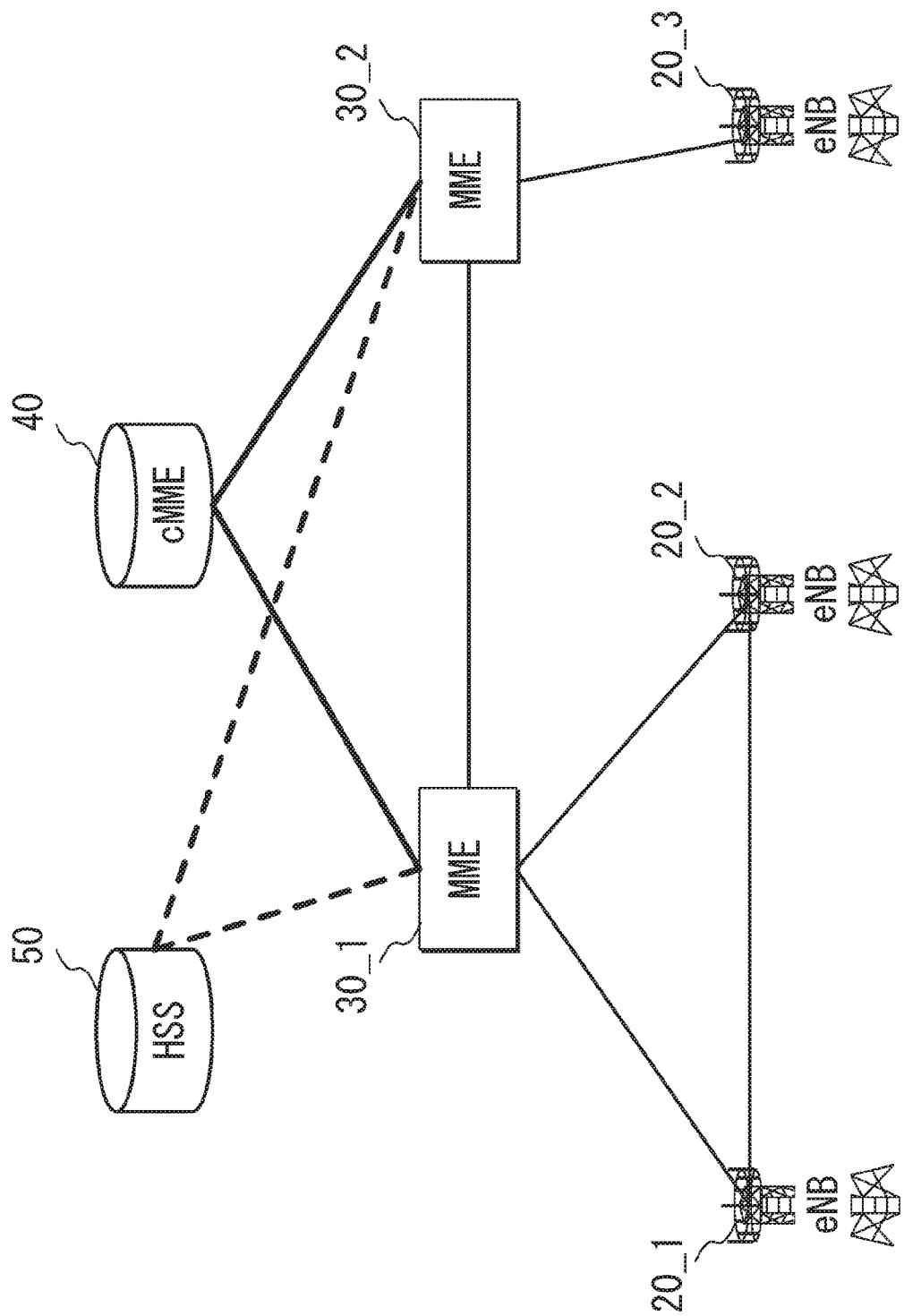
FIG. 2 is a block diagram showing a first case regarding relationships of signaling connection between devices/nodes in the network system according to the exemplary embodiment.

In the above operation (1), as shown by dotted lines in FIG. 2, the MME 30 can access the HSS 50 on demand through the existing interface. In the above operations (2) to (4), as shown by thick lines in FIG. 2, the MME 30 and the cMME 40 interact with each other through new interface.

Figure 3:
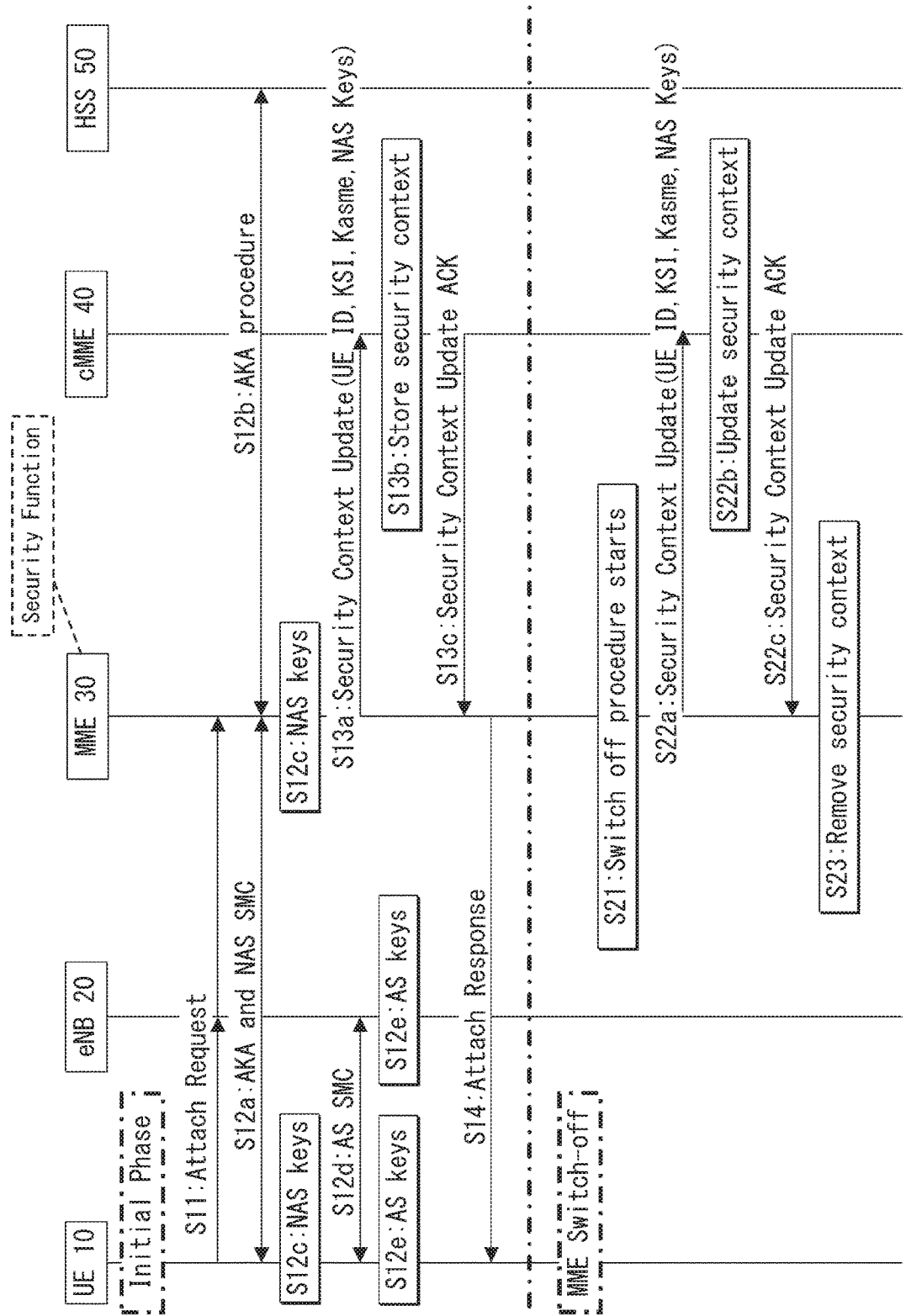
FIG. 3 is a sequence diagram showing a first operation example in the first case.

Specifically, as shown in FIG. 3, at the initial phase, the UE 10 sends an Attach Request message to the MME 30 as in the existing attach procedure (step S11).

The MME 30 performs the existing AKA and NAS SMC procedures, as in NPL 1 (steps S12*a* and S12*b*). Successful NAS SMC procedure results in the UE 10 and the MME 30 sharing same NAS security context which includes NAS keys (step S12*c*).

After that, the UE 10 and the eNB 20 interact with each other to perform AS (Access Stratum) SMC procedure (step S12*d*). Successful AS SMC procedure results in the UE 10 and the eNB 20 sharing same AS security context which includes AS keys (step S12*e*). Note that the AS keys are used for protecting integrity and confidentiality of traffic at RRC (Radio Resource Control) protocol layer between the UE 10 and the eNB 20.

In parallel with the AS SMC procedure, the MME 30 sends a Security Context Update message to the cMME 40 (step S13*a*). This message includes UE ID (identifier of the UE 10) and NAS security context which contains KSI, Kasme and NAS keys.

The cMME 40 stores the security context received at step S13*a* (step S13*b*), and sends a Security Context Update Ack (Acknowledgment) message to the MME 30 (step S13*c*).

The MME 30 sends an Attach response message to the UE 10 (step S14).

After that, due to power-off, overload or system down, the MME 30 starts Switch-off procedure (step S21).

In this procedure, the MME 30 sends a Security Context Update message to the cMME 40 (step S22*a*). This message includes the UE ID and the latest NAS security context which contains KSI, Kasme and NAS keys.

The cMME 40 updates the security context stored for the given UE 10 with the latest security context received at step S22*a* (step S22*b*), and sends a Security Context Update Ack message to the MME 30 (step S22*c*).

Then, the MME 30 removes the security context which the MME 30 kept local (step S23).

Figure 4:
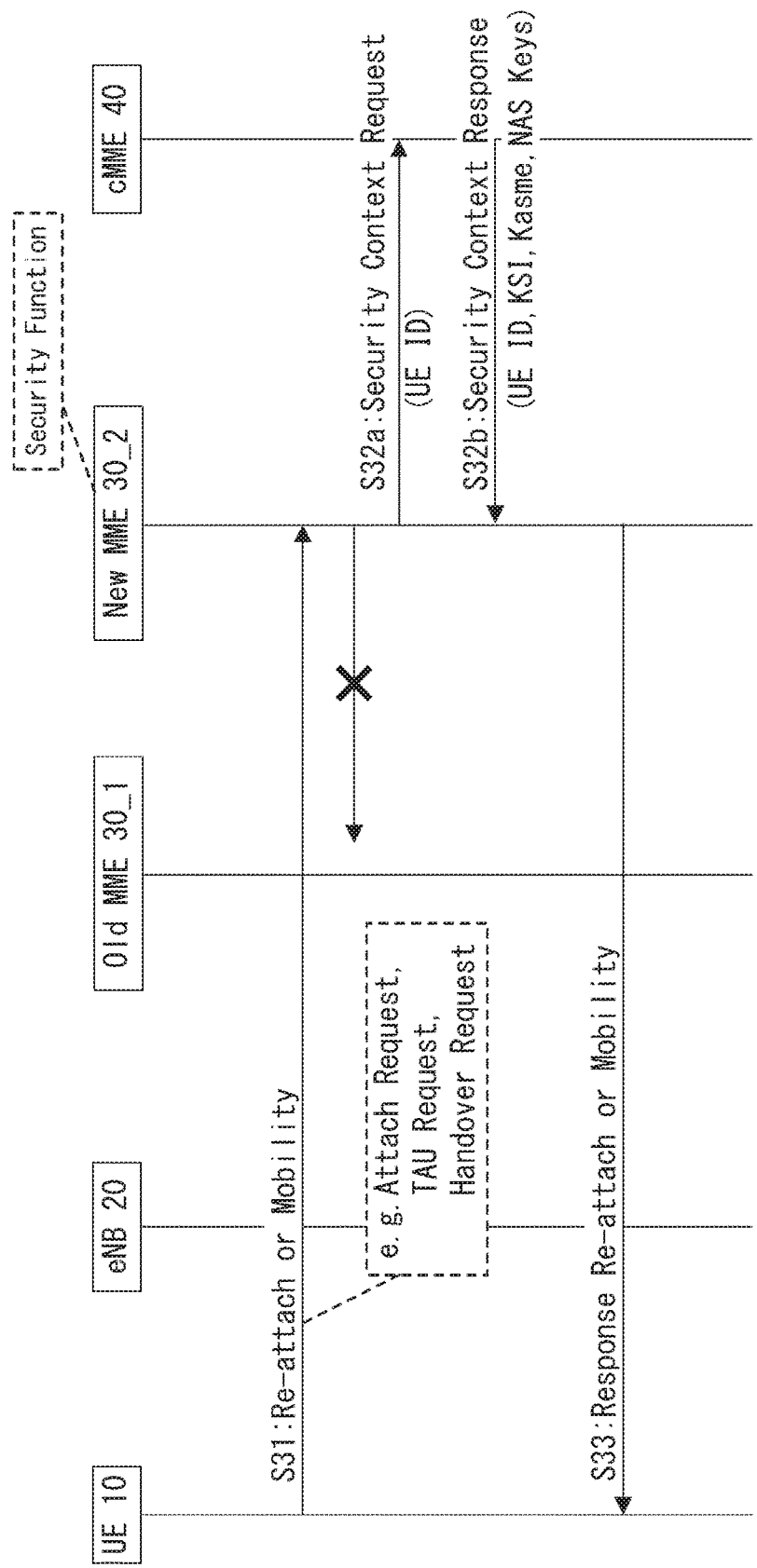
FIG. 4 is a sequence diagram showing a second operation example in the first case.

On the other hand, in mobility, the network system operates as shown in FIG. 4. Note that the operation shown in FIG. 4 takes, as an example, a case where the UE 10 has been previously attached to the MME 30_1 and newly attaches to the MME 30_2, i.e., a case where the MME 30_1 is "Old MME" and the MME 30_2 is "New MME". Meanwhile, the mobility also includes Idle mobility, i.e., TAU (Tracking Area Update), and Handover procedure.

Specifically, the UE 10 sends an Attach Request message, a TAU Request message, or a Handover Request message to the New MME 30_2 (step S31).

The New MME 30_2 will not go to the Old MME 30_1, but request for security context from the cMME 40, by sending a Security Context Request message including the UE ID to the cMME 40 (step S32*a*).

The cMME 40 retrieves the UE's context corresponding to the received UE ID, and sends back to the New MME 30_2 a Security Context Response message including the UE ID and the retrieved NAS security context which contains KSI, Kasme and NAS keys (step S32*b*).

Then, the New MME 30_2 sends a response message to the Attach or Mobility request back to the UE 10 (step S33). This message can be protected by the NAS keys received from the cMME 40.

According to this case "A", the security context is stored on the cloud MME, instead of the (local) MME itself. Thus, it is possible to reduce signaling messages when the UE changes an MME or when the MME is down, because of avoiding redundant AKA/NAS SMC procedures to be performed. Accordingly, it is possible to alleviate overload on the AKA/NAS SMC procedures, such as signaling overload to devices/nodes, in particular the MME, involved in the AKA/NAS SMC procedures and all interfaces therebetween.

<Case B>

This case "B" deals with a case where the cMME 40 has complete security functionalities.

Figure 17:
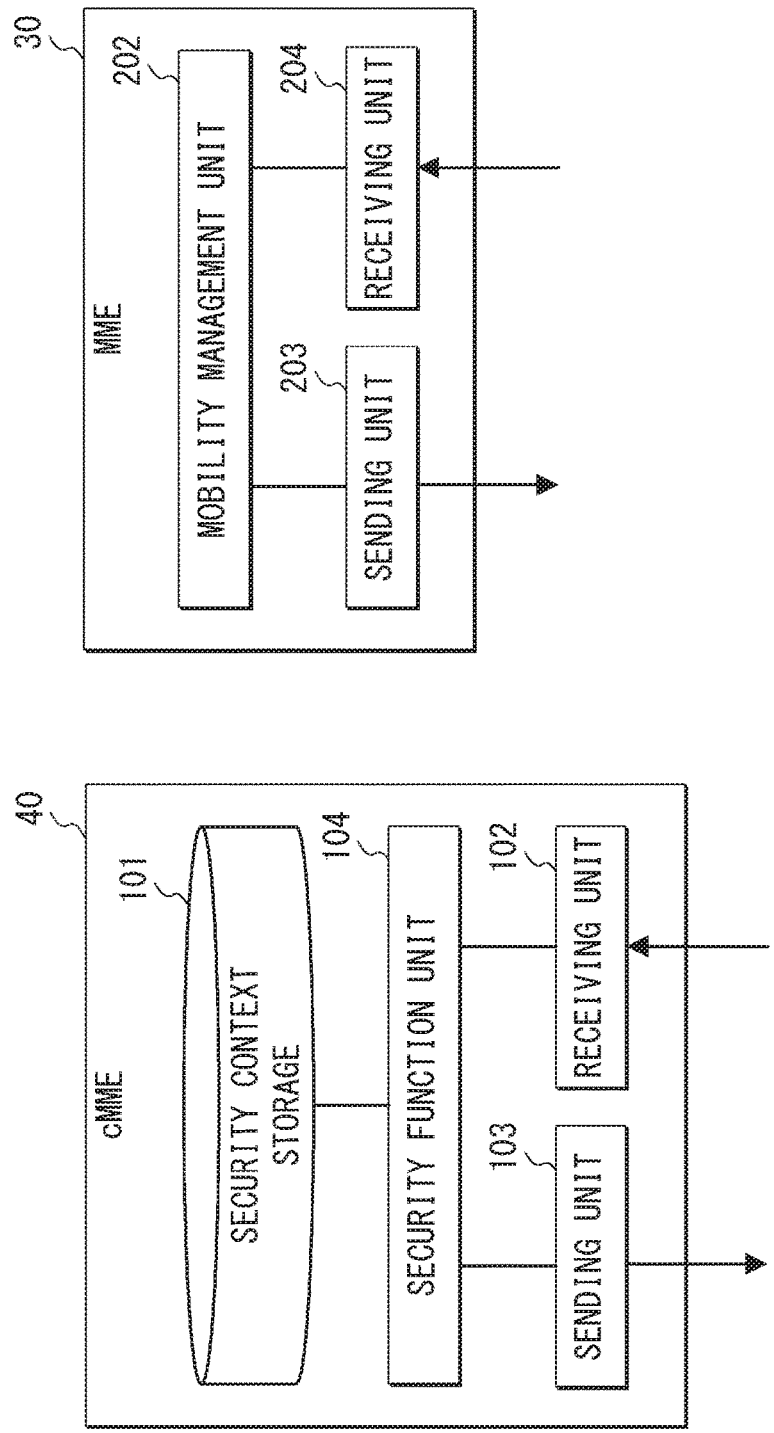
FIG. 17 is a block diagram showing conceptual configurations of the MME according to the exemplary embodiment, in the second and third cases.

That is, as conceptually shown in FIG. 17, the cMME 40 further includes a security function unit 104 in addition to the elements shown in FIG. 16. The security function unit 104 creates and updates security context for the UE 10, as a substitute for the MME 30. The sending unit 103 can send the security context to the MME 30.

On the other hand, the security function unit 201 shown in FIG. 16 is removed from the MME 30, and is shifted to the cMME 40 as the security function unit 104. Thus, functionalities of the MME 30 are further simplified compared with those shown in FIG. 16.

Briefly, in this case "B", the following operations (1) to (3) are carried out.

(1) AKA and NAS SMC procedures happen at the offload location (cMME 40).

(2) NAS keys are passed to the MME 30 after SMC.

(3) On handover (S1 or X2), NH (Next Hop) is calculated at the offload location (cMME 40) and passed to the eNB 20.

Figure 5:
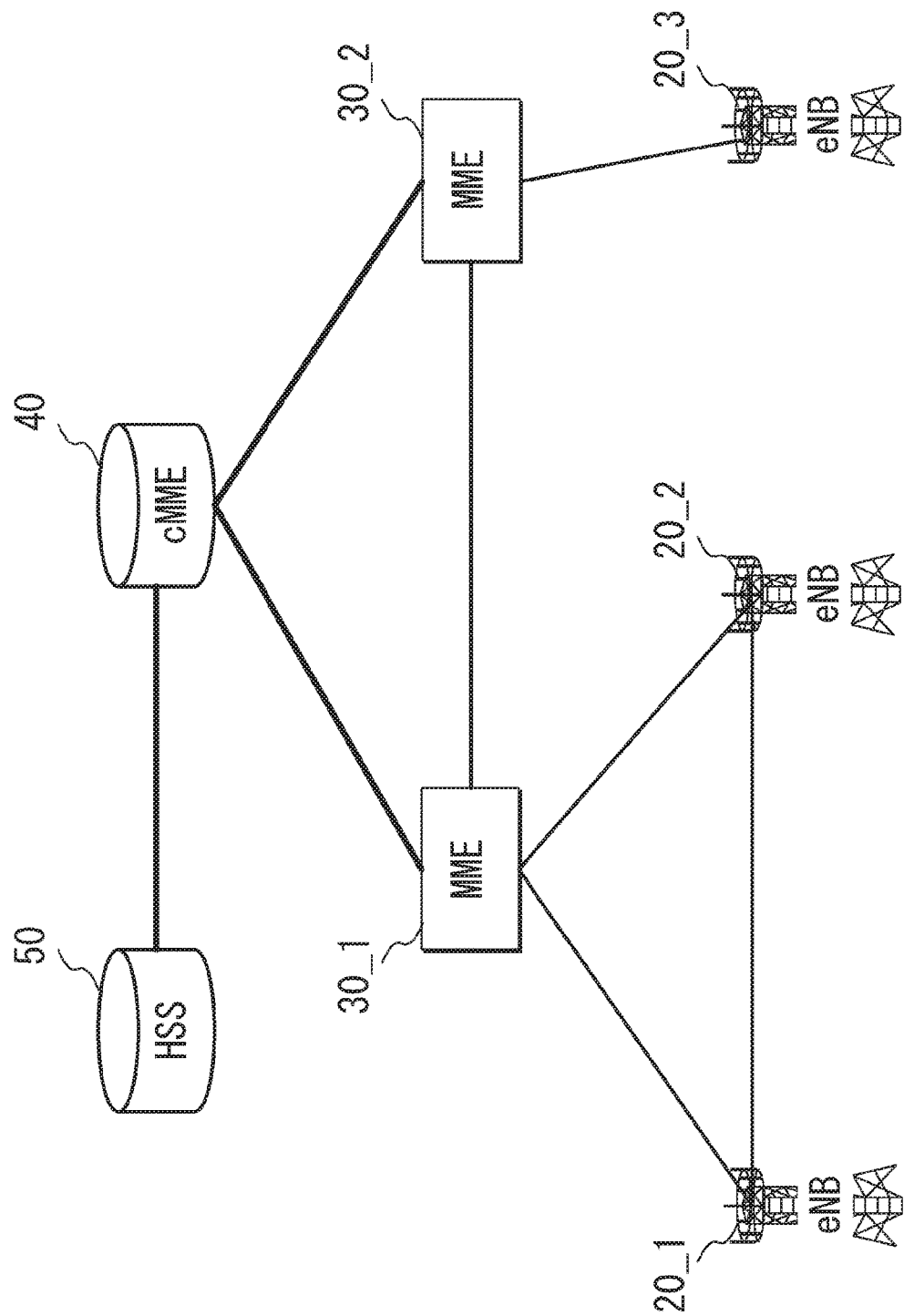
FIG. 5 is a block diagram showing a second case regarding relationships of signaling connection between devices/nodes in the network system according to the exemplary embodiment.

In the above operations (1) to (3), as shown by thick lines in FIG. 5, the cMME 40 interacts with the HSS 50 and the MME 30 through new interfaces.

Figure 6:
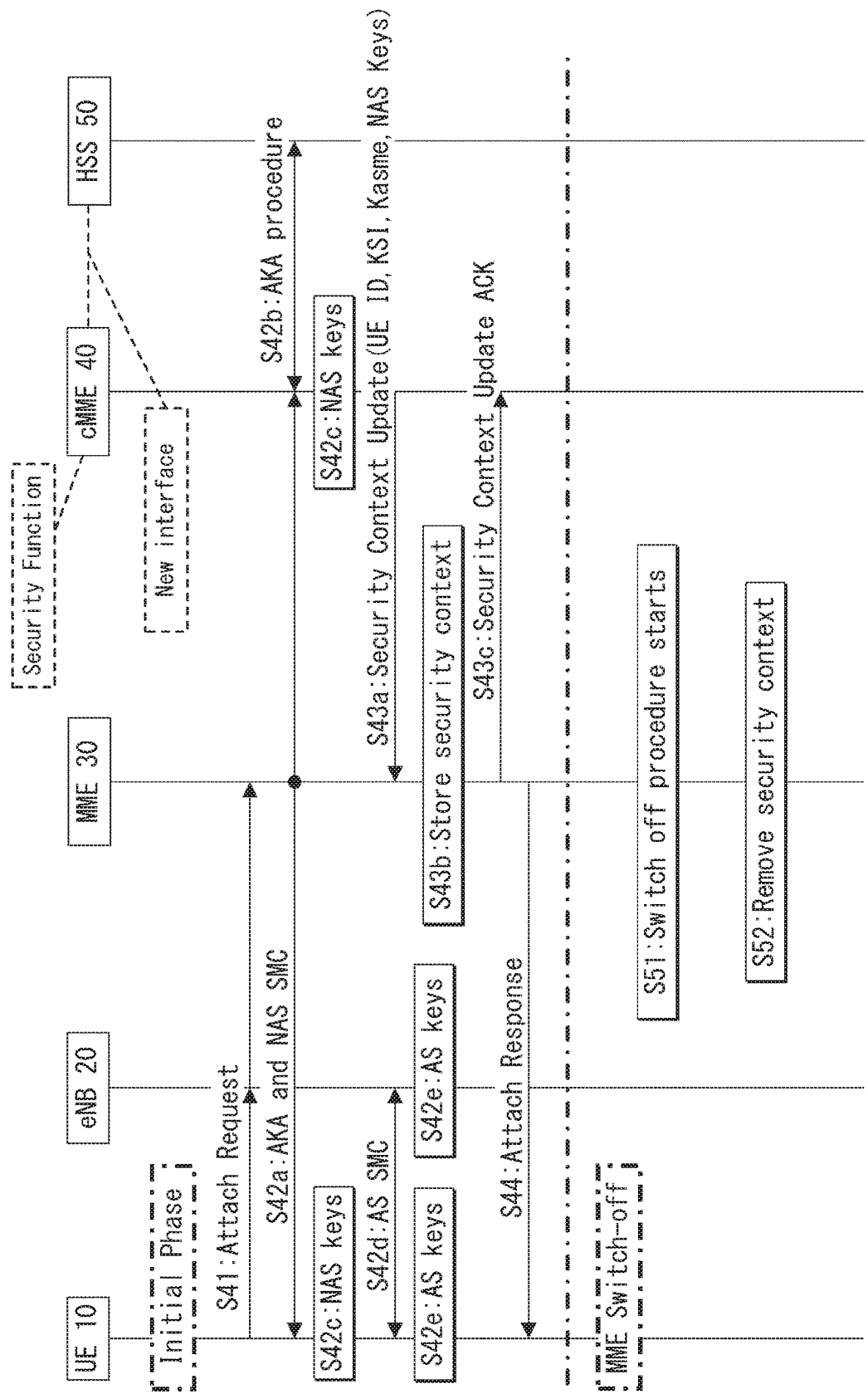
FIG. 6 is a sequence diagram showing a first operation example in the second case.

Specifically, as shown in FIG. 6, at the initial phase, the UE 10 sends an Attach Request message to the MME 30 as in the existing attach procedure (step S41).

AKA and NAS SMC procedures are carried between the UE 10 and the cMME 40 (step S42*a*), and the cMME 40 interacts with the HSS 50 on demand (step S42*b*). Successful NAS SMC procedure results in the UE 10 and the cMME 40 sharing same NAS security context (step S42*c*).

After that, the UE 10 and the eNB 20 interact with each other to perform AS SMC procedure (step S42*d*). Successful AS SMC procedure results in the UE 10 and the eNB 20 sharing same AS security context (step S42*e*).

In parallel with the AS SMC procedure, the c MME 40 sends a Security Context Update message to the MME 30 (step S43*a*). This message includes the UE ID and the NAS security context which contains KSI, Kasme and NAS keys.

The MME 30 stores the security context received at step S43*a* (step S43*b*), and sends a Security Context Update Ack message to the cMME 40 (step S43*c*).

Then, the MME 30 sends an Attach response message to the UE 10 (step S44).

After that, due to power-off, overload or system down, the MME 30 starts Switch-off procedure (step S51).

In this procedure, unlike the above case "A", the MME 30 merely removes the security context which the MME 30 kept local (step S52).

Figure 7:
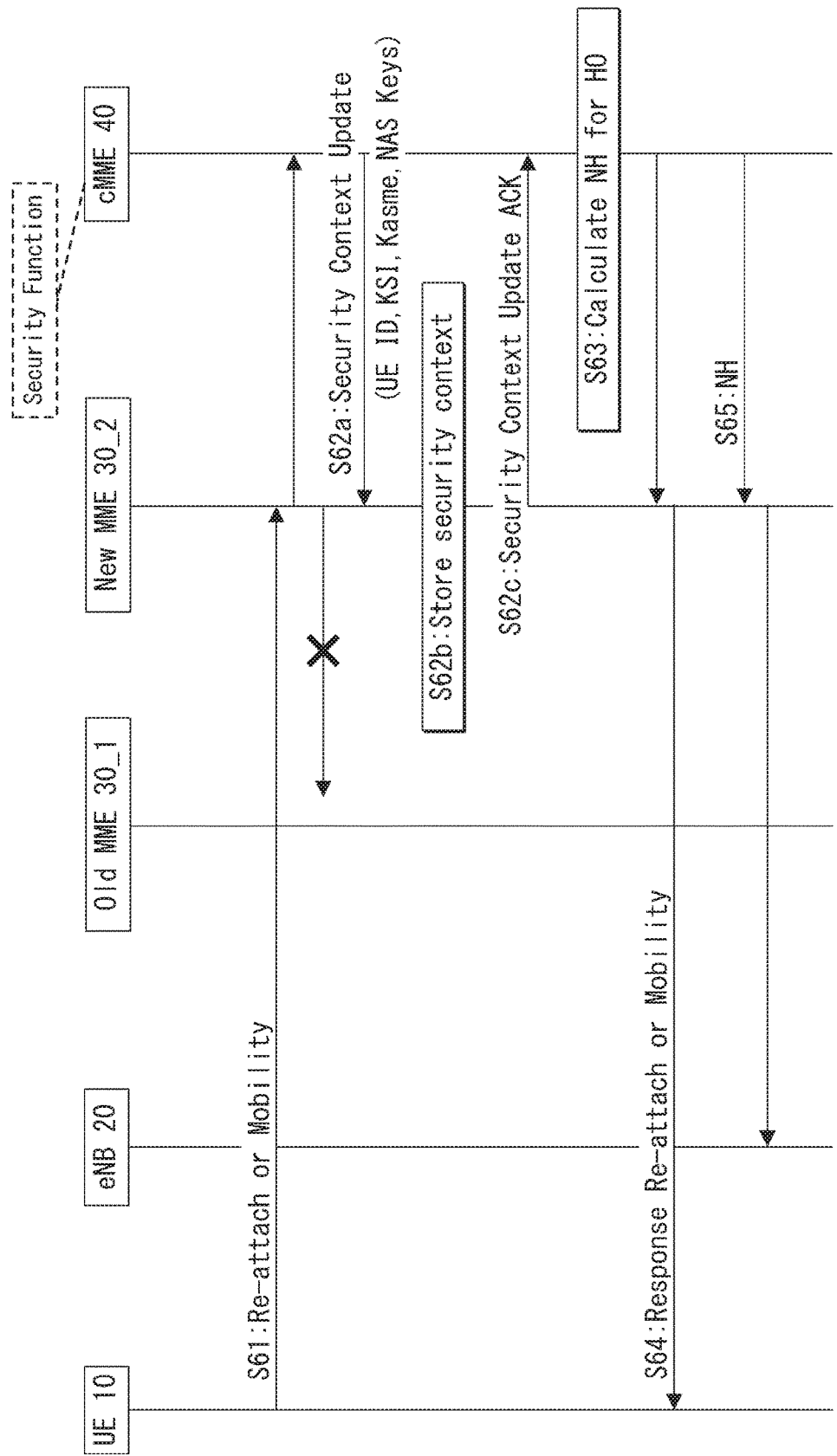
FIG. 7 is a sequence diagram showing a second operation example in the second case.

On the other hand, in mobility, the network system operates as shown in FIG. 7. Note that the operation shown in FIG. 7 takes, as an example, a case where the UE 10 has been previously attached to the Old MME 30_1 and newly attaches to the New MME 30_2. Meanwhile, the mobility also includes Idle mobility (i.e., TAU), and Handover procedure.

Specifically, the UE 10 sends an Attach Request message, a TAU Request message, or a Handover Request message to the New MME 30_2 (step S61). The New MME 30_2 will not go to the Old MME 30_1, forward the message from the UE 10 to the cMME 40.

The cMME 40 sends the latest UE context to the MME 30, by sending a Security Context Update message including the UE ID and the NAS security context which contains KSI, Kasme and NAS keys (step S62*a*).

The MME 30 stores the received security context (step S62*b*), and sends a Security Context Update Ack message back to the cMME 40 (step S62*c*).

Then, the cMME 40 sends a Response message to the Attach or Mobility request to the UE 10 (step S64).

Moreover, in Mobility, the cMME 40 also generates or calculates NH (step S63), and sends the NH to the eNB 20 (step S65). Note that the NH is one of parameters necessary for AS security.

According to this case "B", as with the above case "A", it is possible to reduce signaling messages when the UE changes an MME or when the MME is down, because of avoiding redundant AKA/NAS SMC procedures to be performed. Accordingly, it is possible to alleviate overload on the AKA/NAS SMC procedures, such as signaling overload to devices/nodes, in particular the MME, involved in the AKA/NAS SMC procedures and all interfaces therebetween.

In addition, according to this case "B", the cMME performs AKA and NAS SMC procedures as a substitute for the MME, and sends the security context to the local MME. Therefore, it is also possible to reduce cost for the MME and the like.

<Case C>

This case "C" deals with a case where the cMME 40 has complete security functionalities and direct connection to the eNB 20.

Conceptually, the cMME 40 and the MME 30 in this case "C" can be configured as with those shown in FIG. 17. Meanwhile, unlike the above case "B", the receiving unit 102 and the sending unit 103 can send and receive signaling messages directly from and to the UE 10, through the eNB 20.

Briefly, in this case "C", the following operations (1) and (2) are carried out.

(1) Everything will happen similar to the above case "B" except that the MME 30 will not be in middle.

(2) Offload location (cMME 40) will send keying material to the MME 30 and the eNB 20.

Figure 8:
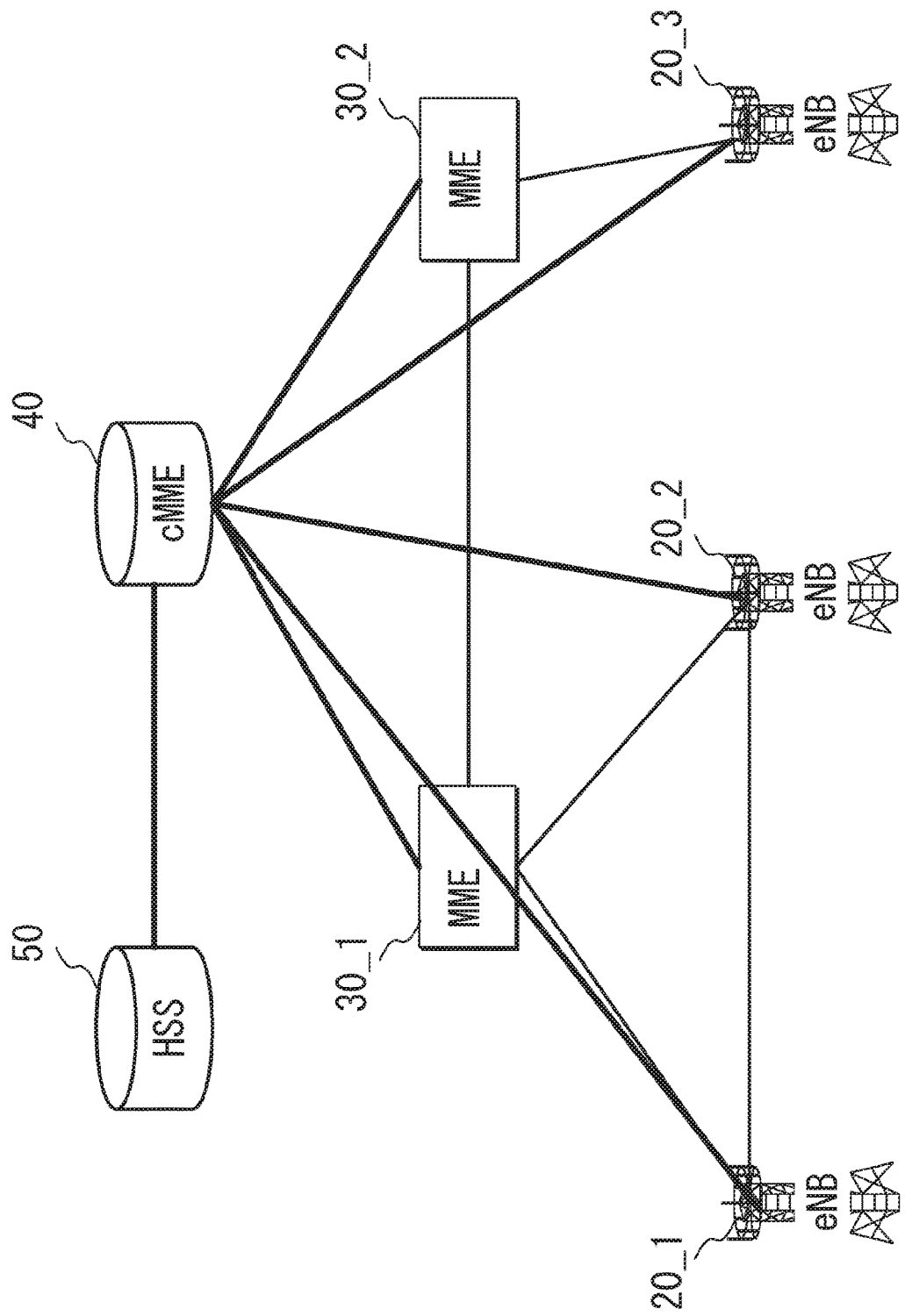
FIG. 8 is a block diagram showing a third case regarding relationships of signaling connection between devices/nodes in the network system according to the exemplary embodiment.

In the above operations (1) and (2), as shown by thick lines in FIG. 8, the cMME 40 interacts with the HSS 50, the MME 30 and the eNB 20 through new interfaces.

Figure 9:
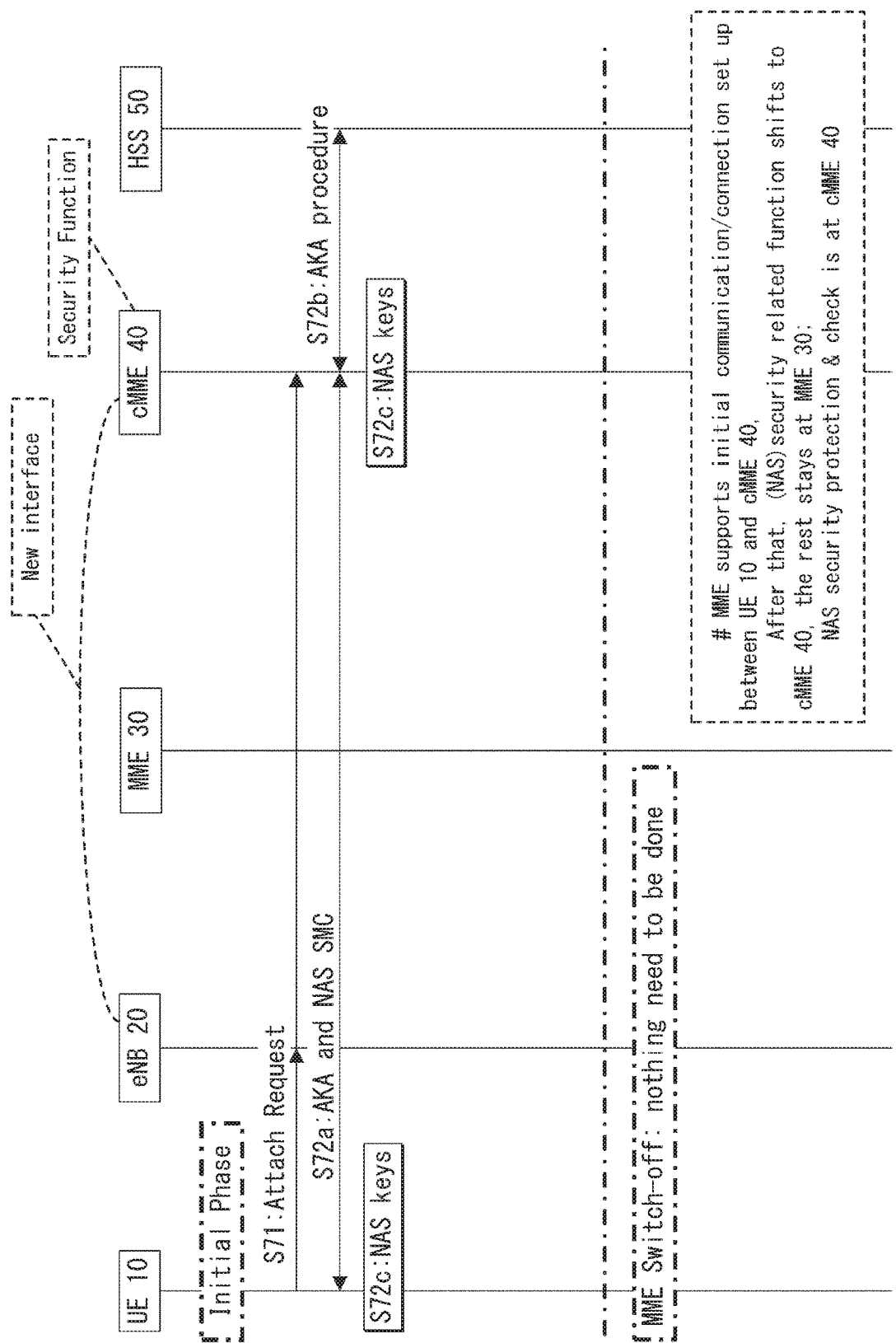
FIG. 9 is a sequence diagram showing a first operation example in the third case.

Specifically, as shown in FIG. 9, at the initial phase, the UE 10 sends an Attach Request message to the cMME 40 (step S71).

AKA and NAS SMC procedures are carried between the UE 10 and the cMME 40 (step S72*a*), and the cMME 40 interacts with the HSS 50 on demand (step S72*b*). Successful NAS SMC procedure results in the UE 10 and the cMME 40 sharing same NAS security context (step S72*c*).

Here, the MME 30 supports initial communication/connection (communication and/or connection) set up between the UE 10 and the cMME 40. After that, (NAS) security related function shifts to the cMME 40, and the rest stays at the MME 30. NAS security protection and check are carried out at the cMME 40.

Therefore, no security context needs to be handled at the MME 30. Moreover, upon the Switch-off procedure, no action needs to be taken at the MME 30.

Figure 10:
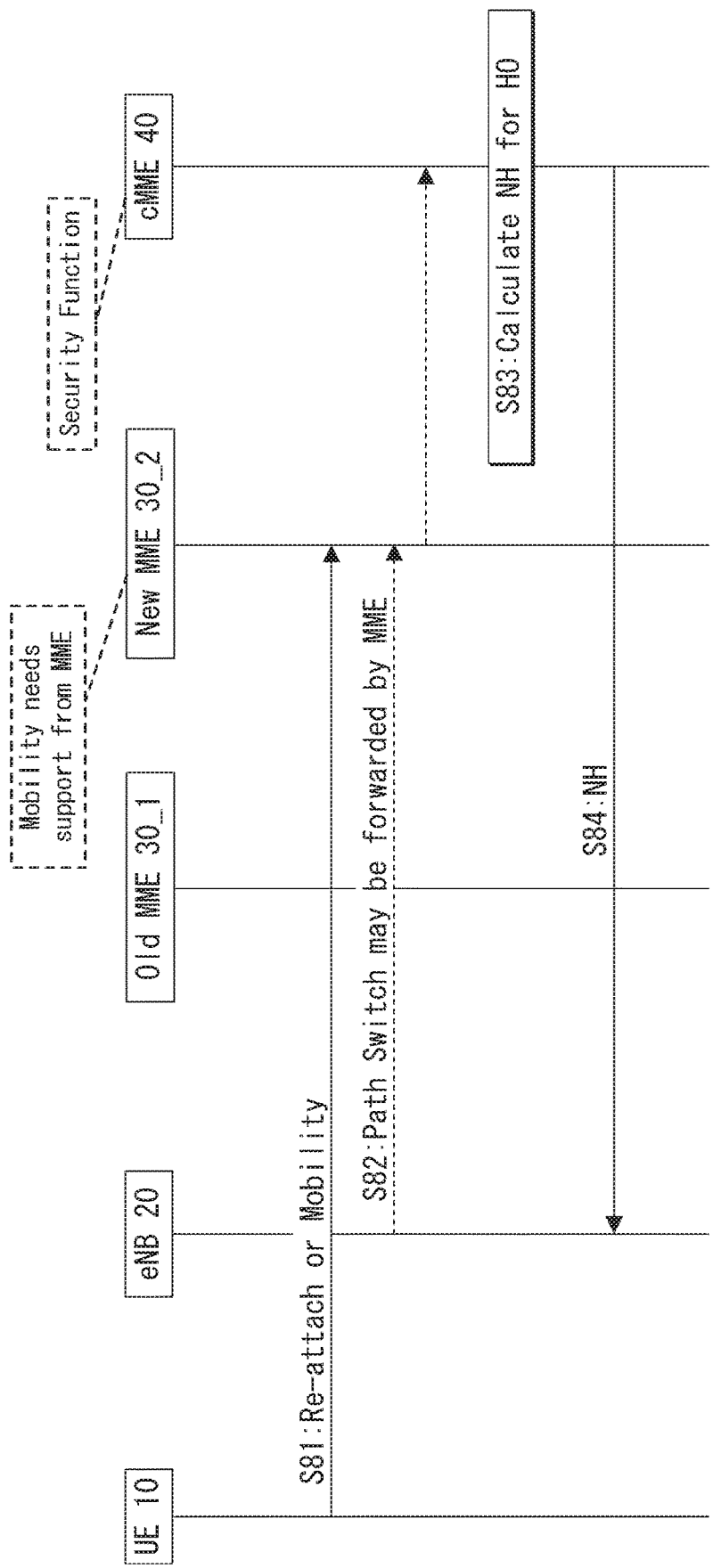
FIG. 10 is a sequence diagram showing a second operation example in the third case.

On the other hand, in mobility, the network system operates as shown in FIG. 10. Note that the operation shown in FIG. 10 takes, as an example, a case where the UE 10 has been previously attached to the Old MME 30_1 and newly attaches to the New MME 30_2. Meanwhile, the mobility also includes Idle mobility (i.e., TAU), and Handover procedure.

Specifically, the UE 10 sends an Attach Request message, a TAU Request message, or a Handover Request message directly to the cMME 40 (step S81). The cMME 40 takes full responsibility for security.

Path Switch procedure can be forwarded by the New MME 30_2 (step S82). The New MME 30_2 only forwards messages but has no security function, does not perform key generation, message protection and check.

Moreover, in Mobility, the cMME 40 calculates NH (step S83), and sends the NH to the eNB 20 (step S84)

According to this case "C", as with the above cases "A" and "B", it is possible to reduce signaling messages when the UE changes an MME or when the MME is down, because security function and context management are centralized into the cMME to avoid redundant AKA/NAS SMC procedures to be performed. Accordingly, it is possible to alleviate overload on the AKA/NAS SMC procedures, such as signaling overload to devices/nodes, in particular the MME, involved in the AKA/NAS SMC procedures and all interfaces therebetween. Moreover, such centralization will be also efficient for virtualization.

In addition, according to this case "C", the cMME has full security function and direct interface with the eNB. Therefore, it is also possible to reduce large amount of signaling especially in mobility.

Next, there will be described configuration examples of the MME 30 and the cMME 40 with reference to FIGS. 11 to 15.

Figure 11:
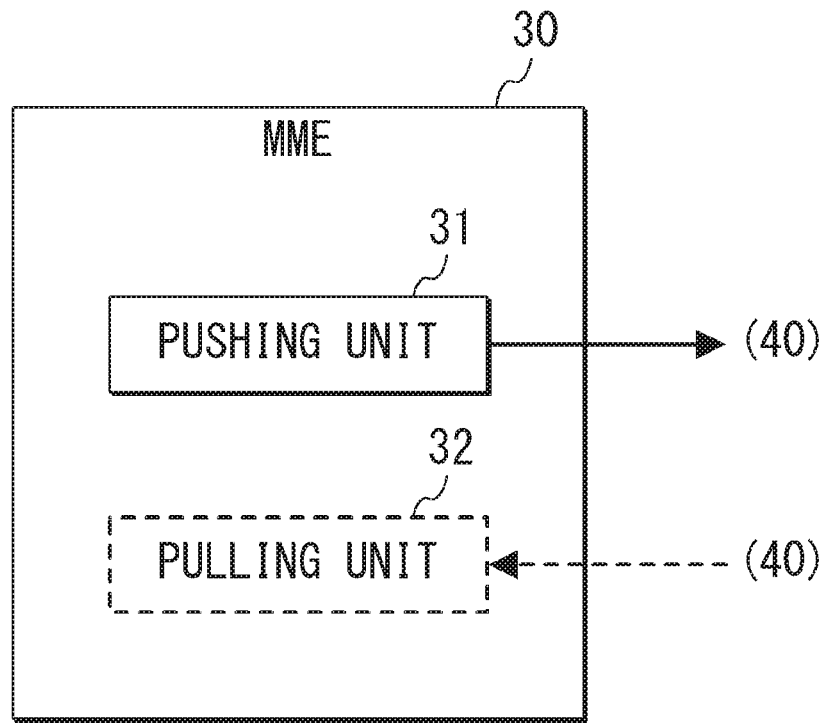
FIG. 11 is a block diagram showing a first configuration example of an MME according to the exemplary embodiment.

Firstly regarding the configuration of the MME 30 in the above case "A", as shown in FIG. 11, the MME 30 includes at least a pushing unit 31. The pushing unit 31 pushes the security context to the cMME 40, at the initial phase. The pushing unit 31 may further push the latest security context to the cMME 40, during the Switch-off procedure. Moreover, the MME 30 may include a pulling unit 32. The pulling unit 32 pulls the security context from the cMME 40, upon the Re-attach and/or Mobility.

Figure 12:
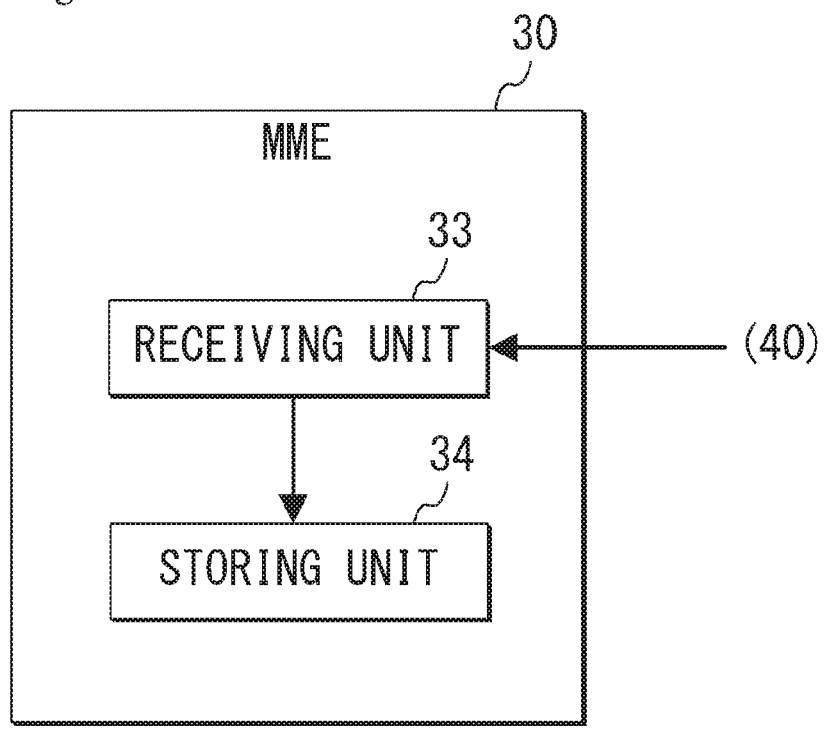
FIG. 12 is a block diagram showing a second configuration example of the MME according to the exemplary embodiment.

In the above case "B", as shown in FIG. 12, the MME 30 includes a receiving unit 33 and a storing unit 34. The receiving unit 33 receives the security context from the cMME 40, at the initial phase. The storing unit 34 stores the received security context. The receiving unit 33 may further receive the latest security context from the cMME 40, upon the Re-attach and/or Mobility.

These units 31 to 34 as well as other element(s) of the MME 30 can be implemented by at least hardware such as a transceiver which conducts communication with the eNB 20, the cMME 40 and the HSS 50, as well as a controller like a CPU (Central Processing Unit) which control this transceivers to execute the processes shown in each of FIGS. 3, 4, 6 and 7, or processes equivalent thereto. The MME 30 can also be implemented by the combination of such hardware, and software (e.g., a program as stored in a memory and executed by the CPU).

Figure 13:
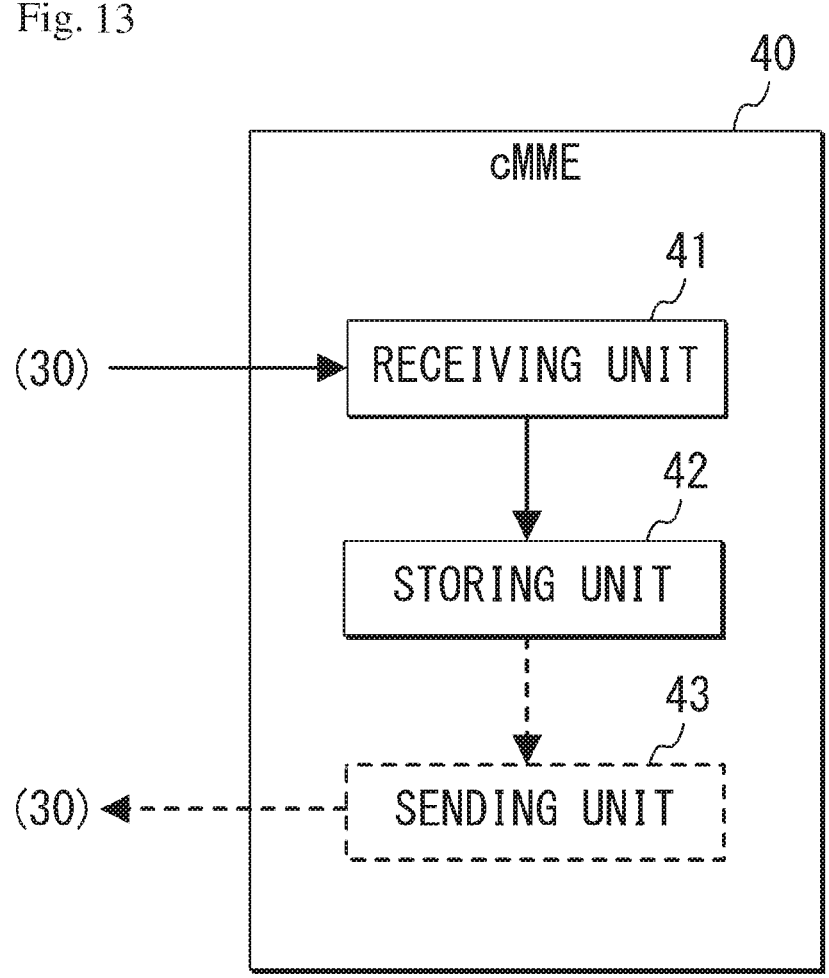
FIG. 13 is a block diagram showing a third configuration example of the MME according to the exemplary embodiment.

Next regarding the configuration of the cMME 40 in the above case "A", as shown in FIG. 13, the cMME 40 includes at least a receiving unit 41 and a storing unit 42. The receiving unit 41 receives the security context pushed from the MME 40, at the initial phase. The storing unit 42 stores the received security context. The receiving unit 41 may further receive the latest security context pushed from the MME 30, during the Switch-off procedure. The storing unit 42 updates the stored security context with the latest security context. Moreover, the cMME 40 may include a sending unit 43. The sending unit 43 sends the stored security context to the MME 30, in response to the Re-attach or Mobility request from the MME 30.

Figure 14:
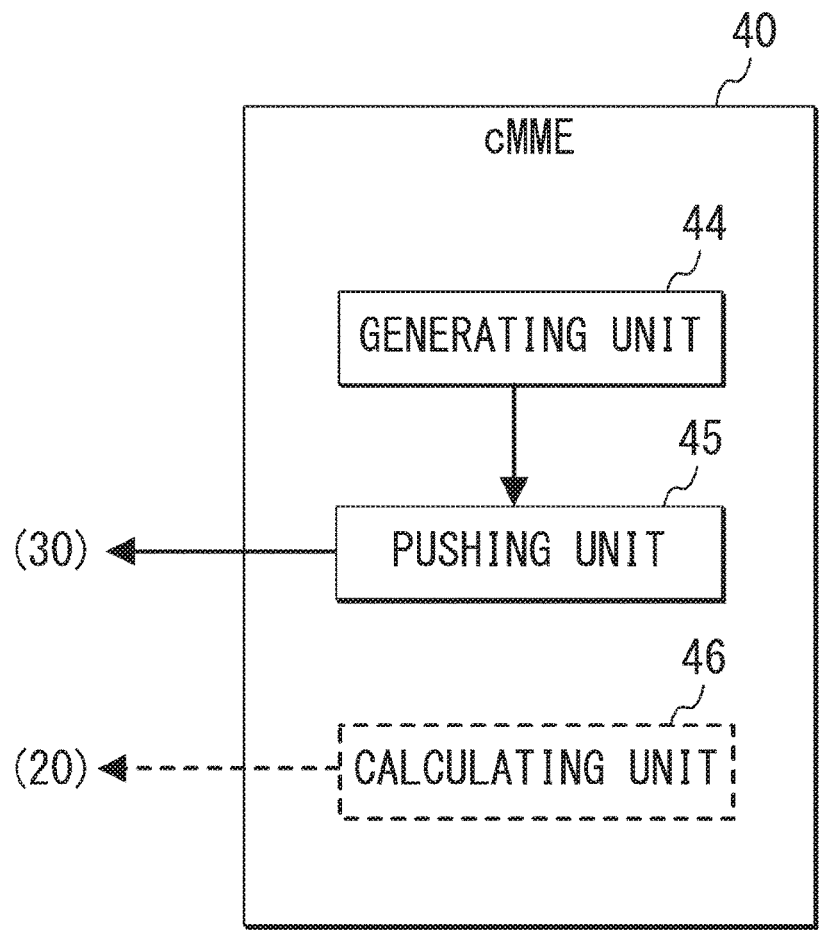
FIG. 14 is a block diagram showing a fourth configuration example of the MME according to the exemplary embodiment.

In the above case "B", as shown in FIG. 14, the cMME 40 includes at least a generating unit 44 and a pushing unit 45. The generating unit 44 generates the security context at the initial phase. The pushing unit 45 pushes the security context to the MME 30. The pushing unit 45 may push the latest security context, upon the Re-attach and/or Mobility. Moreover, the cMME 40 may include a calculating unit 46. The calculating unit 46 calculates the NH in Mobility, and sends the NH through the MME 30 to the eNB 20.

Figure 15:
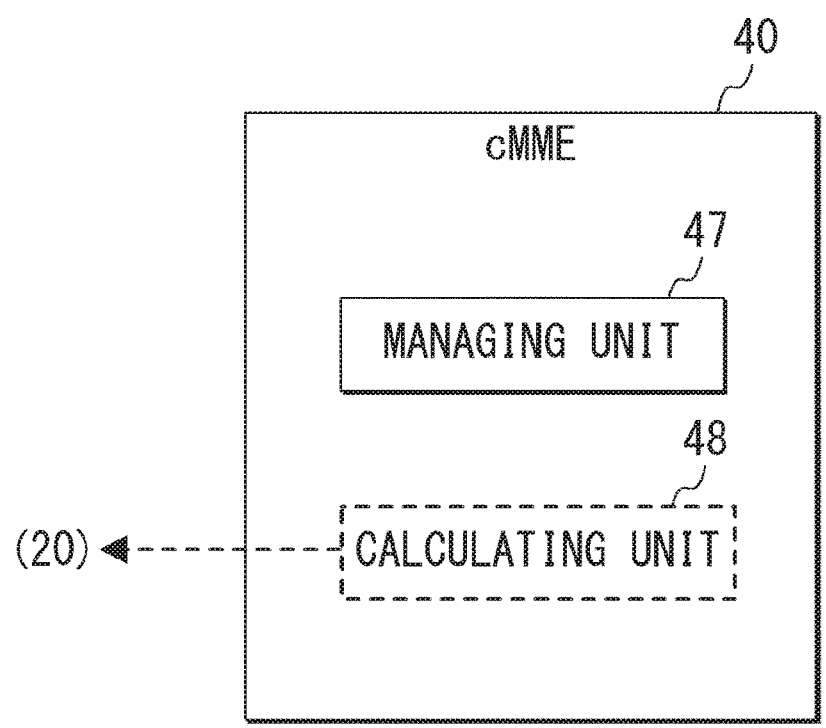
FIG. 15 is a block diagram showing a fifth configuration example of the MME according to the exemplary embodiment.

In the above case "C", as shown in FIG. 15, the cMME 40 includes at least a managing unit 47. The managing unit 47 centrally manages the security context, through the direct connection to the eNB 20. Mobility of the UE 10 is supported from the MME 30. Moreover, the cMME 40 may include a calculating unit 48. The calculating unit 48 calculates the NH in Mobility, and sends the NH through the direct connection to the eNB 20.

These units 41 to 48 as well as other element(s) of the cMME 40 can be implemented by at least hardware such as a transceiver which conducts communication with the eNB 20, the MME 30 and the HSS 50, as well as a controller like a CPU which control this transceivers to execute the processes shown in each of FIGS. 3, 4, 6, 7, 9 and 10, or processes equivalent thereto. The cMME 40 can also be implemented by the combination of such hardware, and software (e.g., a program as stored in a memory and executed by the CPU).

Note that the present invention is not limited to the above-mentioned exemplary embodiment, and it is obvious that various modifications can be made by those of ordinary skill in the art based on the recitation of the claims.

Also, the above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The whole or part of the exemplary embodiment disclosed above can be described as, but not limited to, the following supplementary notes.

(Supplementary Note 1)

A network system comprising:

one or more first MMEs (Mobility Management Entities); and a second MME separated from the first MMEs, wherein the first MME pushes, to the second MME, security context for a UE (User Equipment) that attaches to the first MME, and wherein the second MME stores the security context.

(Supplementary Note 2)

The network system according to Supplementary Note 1, wherein the first MME further pushes the latest security context to the second MME, during a switch-off procedure for the first MME, and wherein the second MME updates the stored security context with the latest security context.

(Supplementary Note 3)

The network system according to Supplementary Note 1 or 2, wherein the first MME pulls the security context from the second MME, when the UE re-attaches to the first MME or is handovered from different one of the first MMEs.

(Supplementary Note 4)

An MME (Mobility Management Entity) comprising:

pushing means for pushing, to a second MME separated from the MME, security context for a UE (User Equipment) that attaches to the MME, wherein the second MME is also separated from one or more first MMEs to which the UE can attach and which is different from the MME.

(Supplementary Note 5)

The MME according to Supplementary Note 4, wherein the pushing means is configured to further push the latest security context to the second MME, during a switch-off procedure for the MME.

(Supplementary Note 6)

The MME according to Supplementary Note 4 or 5, further comprising:

pulling means for pulling the security context from the second MME, when the UE re-attaches to the MME or is handovered from one of the first MMEs.

(Supplementary Note 7)

An MME (Mobility Management Entity) separated from one or more first MMEs, the MME comprising:

receiving means for receiving security context pushed from the first MME, the security context for a UE (User Equipment) that attaches to the first MME; and storing means for storing the security context.

(Supplementary Note 8)

The MME according to Supplementary Note 7, wherein the receiving means is configured to further receive the latest security context pushed from the first MME, during a switch-off procedure for the first MME, and wherein the storing means is configured to update the stored security context with the latest security context.

(Supplementary Note 9)

The MME according to Supplementary Note 7 or 8, further comprising:

sending means for sending the stored security context to the first MME, wherein the sending means is configured to send the stored security context in response to a request from the first MME, the request being issued when the UE re-attaches to the first MME or is handovered from different one of the first MMEs.

(Supplementary Note 10)

A method of managing security context in an MME (Mobility Management Entity), the method comprising:

pushing, to a second MME separated from the MME, security context for a UE (User Equipment) that attaches to the MME, wherein the second MME is also separated from one or more first MMEs to which the UE can attach and which is different from the MME.

(Supplementary Note 11)

A method of managing security context in an MME (Mobility Management Entity) separated from one or more first MMEs, the method comprising:

receiving security context pushed from the first MME, the security context for a UE (User Equipment) that attaches to the first MME; and storing the security context.

(Supplementary Note 12)

A network system comprising:

one or more first MMEs (Mobility Management Entities); and a second MME separated from the first MMEs, wherein the second MME generates security context for a UE (User Equipment) that requests to attach to the first MME, and pushes the security context to the first MME, and wherein the first MME stores the security context.

(Supplementary Note 13)

The network system according to Supplementary Note 12, wherein the second MME pushes the latest security context, when the UE re-attaches to the first MME or is handovered from different one of the first MMEs.

(Supplementary Note 14)

The network system according to Supplementary Note 13, wherein when the UE performs handover, the second MME calculates NH (Next Hop) for the handover, and sends the NH through the first MME to an eNB (evolved Node B) to which the UE wirelessly connects.

(Supplementary Note 15)

An MME (Mobility Management Entity) comprising:

receiving means for receiving, from a second MME separated from the MME, security context for a UE (User Equipment) that requests to attach to the MME; and storing means for storing the security context, wherein the second MME is also separated from one or more first MMEs to which the UE can attach and which is different from the MME.

(Supplementary Note 16)

The MME according to Supplementary Note 15, wherein the receiving means is configured to further receive the latest security context from the second MME, when the UE re-attaches to the MME or is handovered from one of the first MMEs.

(Supplementary Note 17)

An MME (Mobility Management Entity) separated from one or more first MMEs, the MME comprising:

generating means for generating security context for a UE (User Equipment) that requests to attach to the first MME; and pushing means for pushing the security context to the first MME.

(Supplementary Note 18)

The MME according to Supplementary Note 17, wherein the pushing means is configured to push the latest security context, when the UE re-attaches to the first MME or is handovered from different one of the first MMEs.

(Supplementary Note 19)

The MME according to Supplementary Note 18, further comprising:

calculating means for calculating, when the UE performs handover, NH (Next Hop) for the handover, and for sending the NH through the first MME to an eNB (evolved Node B) to which the UE wirelessly connects.

(Supplementary Note 20)

A method of managing security context in an MME (Mobility Management Entity), the method comprising:

receiving, from a second MME separated from the MME, security context for a UE (User Equipment) that requests to attach to the MME; and storing the security context, wherein the second MME is also separated from one or more first MMEs to which the UE can attach and which is different from the MME.

(Supplementary Note 21)

A method of managing security context in an MME (Mobility Management Entity) separated from one or more first MMEs, the method comprising:

generating security context for a UE (User Equipment) that requests to attach to the first MME; and pushing the security context to the first MME.

(Supplementary Note 22)

A network system comprising:

one or more first MMEs (Mobility Management Entities); and a second MME separated from the first MMEs, wherein the second MME centrally manages security context for a UE (User Equipment) that requests to attach to a network, through a direct connection to an eNB (evolved Node B) to which the UE wirelessly connects, wherein the first MME supports mobility of the UE to the second MME.

(Supplementary Note 23)

The network system according to Supplementary Note 22, wherein when the UE is handovered from one of the first MMEs to another, the second MME calculates NH (Next Hop) for the handover, and sends the NH through the direct connection to the eNB.

(Supplementary Note 24)

An MME (Mobility Management Entity) separated from one or more first MMEs, the MME comprising:

managing means for centrally managing security context for a UE (User Equipment) that requests to attach to a network, through a direct connection to an eNB (evolved Node B) to which the UE wirelessly connects, wherein the first MME supports mobility of the UE to the MME.

(Supplementary Note 25)

The MME according to Supplementary Note 24, further comprising:

calculating means for calculating, when the UE is handovered from one of the first MMEs to another, NH (Next Hop) for the handover, and for sending the NH through the direct connection to the eNB.

(Supplementary Note 26)

A method of managing security context in an MME (Mobility Management Entity) separated from one or more first MMEs, the method comprising:

centrally managing security context for a UE (User Equipment) that requests to attach to a network, through a direct connection to an eNB (evolved Node B) to which the UE wirelessly connects, wherein the first MME supports mobility of the UE to the MME.

(Supplementary Note 27)

New architecture—partially offload MME security function or all.

(Supplementary Note 28)

MME do not need to keep the security context when UE moves away.

(Supplementary Note 29)

MME does not need to know previous MME/SGSN to retrieve security context.

(Supplementary Note 30)

Centralized security function and/or context management, efficiency for virtualization.

(Supplementary Note 31)

New messages—security context update and Ack, security context request and response.

(Supplementary Note 32)

Storing security context on cloud MME, instead of (local) MME itself. This can reduce signaling message when UE changes a MME, or when MME is down.

(Supplementary Note 33)

cMME performs AKA and NAS SMC, and send the security context to local MME. This can reduce MME cost; and achieve the merit in Supplementary not 6.

(Supplementary Note 34)

cMME has full security function, and direct NEW interface with eNB. This can reduce large signaling especially in mobility.

This application is based upon and claims the benefit of priority from Japanese patent application No. 2015-026201, filed on Feb. 13, 2015, the disclosure of which is incorporated herein in its entirety by reference.

REFERENCE SIGNS LIST

10 UE
20, 20_1-20_3 eNB
30, 30_1-30_2 MME
31, 45 PUSHING UNIT
32 PULLING UNIT
33, 41 RECEIVING UNIT
34, 42 STORING UNIT
40 cMME
43 SENDING UNIT
44 GENERATING UNIT
46, 48 CALCULATING UNIT
47 MANAGING UNIT
50 HSS
101 SECURITY CONTEXT STORAGE
102, 204 RECEIVING UNIT
103, 203 SENDING UNIT
104, 201 SECURITY FUNCTION UNIT
202 MOBILITY MANAGEMENT UNIT

The invention claimed is:

1. A method performed by a first communication apparatus for performing mobility management of a User Equipment (UE), the method comprising:
receiving, from the UE via a base station, a request message;
sending, to a second communication apparatus, a request to execute authentication of the UE;
receiving, from the second communication apparatus, security related information once the UE has been authenticated by the second communication apparatus based on information for authenticating the UE obtained from a third communication apparatus; and
sending, to the UE, an accept message of the request message.

2. The method according to claim 1, wherein the security related information is used to derive a Non Access Stratum (NAS) key.

3. A first communication apparatus for performing mobility management of a User Equipment (UE) comprising:
a receiver configured to
receive, from a User Equipment (UE) via a base station, a request message; and
a transmitter configured to
send, to a second communication apparatus, a request to execute authentication of the UE, wherein the receiver is further configured to receive, from the second communication apparatus, a security related information once the UE has been authenticated by the second communication apparatus based on information for authenticating the UE obtained from a third communication apparatus, and wherein the transmitter is further configured to send, to the UE, an accept message of the request message.

4. The first communication apparatus according to claim 3, wherein the security related information is used to derive a Non Access Stratum (NAS) key.

5. A method performed by a User Equipment (UE), the method comprising:
sending, to a first communication apparatus that performs mobility management of the UE via a base station, a request message; and
receiving, from the first communication apparatus, an accept message of the request message, wherein the first communication apparatus sends, to a second communication apparatus, a request to execute authentication of the UE if the first communication apparatus receives the request message, wherein the UE is authenticated by the second communication apparatus based on information for authenticating the UE obtained from a third communication apparatus, and wherein the UE receives the accept message from the first communication apparatus that has received security related information from the second communication apparatus.

6. The method according to claim 5, wherein the security related information is used to derive a Non Access Stratum (NAS) key.

7. A User Equipment (UE) comprising:
a transmitter configured to send, to a first communication apparatus that performs mobility management of the UE via a base station, a request message; and
a receiver configured to receive, from the first communication apparatus, an accept message of the request message, after the first communication apparatus sends, to a second communication apparatus, a request to execute authentication of the UE if the first communication apparatus receives the request message, wherein the UE is authenticated by the second communication apparatus based on information for authenticating the UE obtained from a third communication apparatus, and wherein the UE receives the accept message from the first communication apparatus that has received security related information from the second communication apparatus.

8. The UE according to claim 7, wherein the security related information is used to derive a Non Access Stratum (NAS) key.

* * * * *